(12) United States Patent
Lee et al.

(10) Patent No.: US 8,653,944 B2
(45) Date of Patent: Feb. 18, 2014

(54) RFID DEVICE AND METHODS FOR CONTROLLING POWER SUPPLY ACCORDING TO CONNECTION WITH HOST AND OPERATION MODE

(75) Inventors: Jangwon Lee, Seoul (KR); Joohyung Lee, Seoul (KR)

(73) Assignee: Bluebird Soft Co., Ltd. (KR)

( * ) Notice: Subject to any disclaimer, the term of this patent is extended or adjusted under 35 U.S.C. 154(b) by 834 days.

(21) Appl. No.: 12/519,207

(22) PCT Filed: Dec. 14, 2007

(86) PCT No.: PCT/KR2007/006526
§ 371 (c)(1),
(2), (4) Date: Jun. 15, 2009

(87) PCT Pub. No.: WO2008/072922
PCT Pub. Date: Jun. 19, 2008

(65) Prior Publication Data
US 2010/0060428 A1  Mar. 11, 2010

(30) Foreign Application Priority Data
Dec. 15, 2006 (KR) .................. 10-2006-0128900
Dec. 15, 2006 (KR) .................. 10-2006-0128902

(51) Int. Cl.
*H04Q 5/22* (2006.01)
(52) U.S. Cl.
USPC ............................ 340/10.1; 455/557; 455/558
(58) Field of Classification Search
USPC ....................................................... 340/10.1
See application file for complete search history.

(56) References Cited

U.S. PATENT DOCUMENTS

| 2005/0016303 | A1* | 1/2005 | Jacobs et al. | 73/865.9 |
| 2005/0083181 | A1* | 4/2005 | Jalkanen et al. | 340/10.34 |
| 2006/0170553 | A1 | 8/2006 | Bierach | |
| 2008/0259551 | A1* | 10/2008 | Gavenda et al. | 361/684 |
| 2008/0303631 | A1* | 12/2008 | Beekley et al. | 340/5.74 |
| 2010/0259279 | A1* | 10/2010 | Shearon et al. | 324/538 |

FOREIGN PATENT DOCUMENTS

| EP | 1600885 A1 * | 11/2005 |
| KR | 1020060001122 | 1/2006 |
| KR | 1020060031477 | 4/2006 |
| KR | 1020060109155 | 10/2006 |
| WO | 2004/036482 | 4/2004 |

OTHER PUBLICATIONS

International Search Report—PCT/KR2007/006526 dated Mar. 26, 2008.
Written Opinion—PCT/KR2007/006526 dated Mar. 26, 2008.
Search Report issued on Feb. 19, 2010 from E.P.O. in relation to EP application and the cited reference EP 1 600 885 A1; PCT/KR2007/006526.

* cited by examiner

*Primary Examiner* — George Bugg
*Assistant Examiner* — Anthony D Afrifa-Kyei
(74) *Attorney, Agent, or Firm* — Cantor Colburn LLP (57) ABSTRACT

A radio frequency identification (RFID) device and method for controlling power supply are provided. The RFID device controls power supply to its elements based on its connection with a host and its operation mode, thereby reducing power consumption.

16 Claims, 5 Drawing Sheets

RFID DEVICE AND METHODS FOR CONTROLLING POWER SUPPLY ACCORDING TO CONNECTION WITH HOST AND OPERATION MODE

TECHNICAL FIELD

The present invention relates to a radio frequency identification (RFID) device, and more particularly, to an RFID device and method for controlling a voltage supplied to elements according to connection with a host and an operation mode.

BACKGROUND ART

Radio frequency identification (RFID) technology was developed in the middle of the 20th century and has drawn attention since it was used for stock management and supply chain management at the end of 1990. RFID is a method of identifying individual products using frequency.

Figure 1:
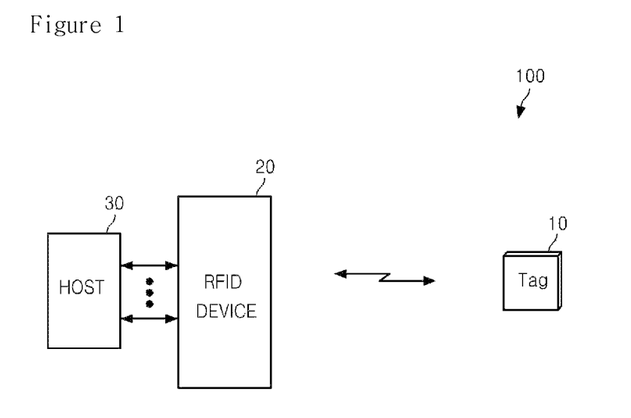
FIG. 1 illustrates a conventional radio frequency identification (RFID) system.

FIG. 1 illustrates a conventional RFID system 100. The RFID system 100 includes a tag 10, an RFID device 20, and a host 30. The tag 10 is attached to a product and stores predetermined data. The RFID device 20 is connected with the host 30 (e.g., a personal digital assistant (PDA) or a mobile phone) for data communication and identifies the tag 10 using RF communication.

The RFID device 20 may include a microprocessor having a built-in universal asynchronous receiver/transmitter (UART) for the data communication with the host 30. Generally, the RFID device 20 includes a power supply (e.g., a battery) independent of the host 30 and tends to be miniaturized and mobilized. Therefore, it is desired to reduce power consumption of the RFID device 20 by controlling power supply to elements of the RFID device 20 when the RFID device 20 is not connected with the host 30 or when the RFID device 20 does not need to communicate with the host 30 in more than a predetermined period of time.

DISCLOSURE

Technical Problem

The present invention provides a radio frequency identification (RFID) device and method for reducing power consumption by controlling power supply to elements of the RFID device based on the connection between the RFID device and a host and the operation mode of the RFID device.

Advantageous Effects

According to the present invention, supply of voltage of a battery embedded in a radio frequency identification (RFID) device is interrupted when the RFID device is not connected with a host and a voltage supplied every element of the RFID except for a microprocessor is interrupted in a sleep mode so that power consumption of the RFID is reduced.

DESCRIPTION OF DRAWINGS

The drawings referred to in the description of the present invention will be more apparent by the brief description of the drawings.

BEST MODE

According to an aspect of the present invention, there is provided a radio frequency identification (RFID) device including an RFID connector, a radio frequency (RF) transceiver, a microprocessor, a battery, and a voltage supply controller. The RFID connector is connected with a host connector for data interface. The RF transceiver performs wireless data communication with a tag. The microprocessor performs data communication with a host via the RFID connector and receives tag information from the tag via the RF transceiver. The battery supplies a predetermined battery voltage. The voltage supply controller controls supply of the predetermined battery voltage to the microprocessor and/or the RF transceiver based on connection or disconnection between the RFID connector and the host connector.

The voltage supply controller may include a switch circuit configured to supply the predetermined battery voltage to the microprocessor and/or the RF transceiver or interrupt the supply of the predetermined battery voltage to the microprocessor and/or the RF transceiver based on the connection or disconnection between the RFID connector and the host connector; and a capacitor configured to be charged based on a voltage output from the switch circuit.

According to another aspect of the present invention, there is provided an RFID device including an RFID connector, an RF transceiver, a microprocessor, a battery, and a voltage supply controller. The RFID connector is connected with a host connector for data interface. The RF transceiver performs wireless data communication with a tag. The microprocessor performs data communication with a host via the RFID connector, receives tag information from the tag via the RF transceiver, and detects an operation mode based on a voltage level of a data receiving line of the RFID connector. The battery supplies a predetermined battery voltage. The voltage supply controller controls supply of the predetermined battery voltage to the RF transceiver based on the operation mode.

The voltage supply controller may include a switch circuit configured to supply the predetermined battery voltage to the RF transceiver or interrupt the supply of the predetermined battery voltage to the RF transceiver based on the operation mode, and a capacitor configured to be charged based on a voltage output from the switch circuit.

According to still another aspect of the present invention, there is provided a method of controlling power supply of an RFID device according to connection with a host. The method includes supplying a predetermined battery voltage, and controlling supply of the predetermined battery voltage to a microprocessor and/or an RF transceiver of the RFID device based on connection or disconnection between an RFID connector of the RFID device and a host connector of the host.

The controlling the supply of the predetermined battery voltage to the microprocessor and/or the RF transceiver of the RFID device may include supplying the predetermined battery voltage to the microprocessor and/or the RF transceiver based on the connection or disconnection between the RFID connector and the host connector; interrupting the supply of the predetermined battery voltage to the microprocessor and/or the RF transceiver based on the connection or disconnection between the RFID connector and the host connector; and charging a capacitor based on a voltage supplied to the microprocessor and/or the RF transceiver.

According to yet another aspect of the present invention, there is provided a method of controlling power supply of an RFID device according to an operation mode. The method includes detecting the operation mode based on a voltage level of a data receiving line of an RFID connector of the RFID device, supplying a predetermined battery voltage, and controlling supply of the predetermined battery voltage to an RF transceiver based on the operation mode.

MODE FOR INVENTION

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

Figure 2:
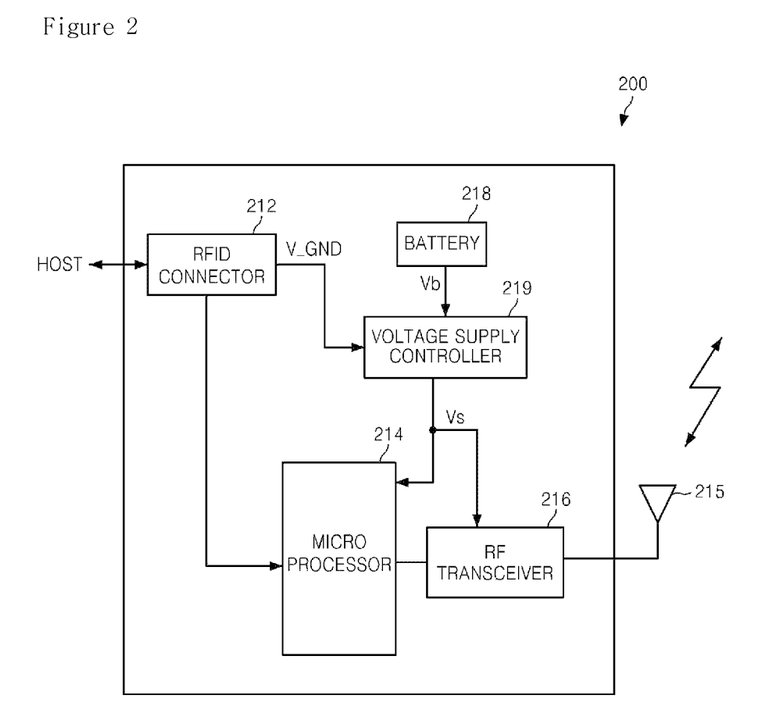
FIG. 2 illustrates an RFID device according to some embodiments of the present invention.

FIG. 2 illustrates a radio frequency identification (RFID) device 200 according to some embodiments of the present invention. Referring to FIG. 2, the RFID device 200 includes an RFID connector 212, a microprocessor 214, an antenna 215, a radio frequency (RF) transceiver 216, a battery 218, and a voltage supply controller 219.

The RFID connector 212 connects to a host connector (not shown) for data communication with a host (not shown). The microprocessor 214 performs data communication with host via the RFID connector 212 and performs wireless data communication with a tag (not shown) via the RF transceiver 216. The RF transceiver 216 receives data from the tag via the antenna 215 and output the received data to the microprocessor 214. The microprocessor 214 transmits the data to the host via the RFID connector 212 using a universal asynchronous receiver/transmitter (UART).

The battery 218 supplies a predetermined battery voltage Vb to the voltage supply controller 219. The voltage supply controller 219 supplies the predetermined battery voltage Vb to the microprocessor 214 and/or the RF transceiver 216 or interrupts the supply based on the connection or disconnection between the host connector of the host and the RFID connector 212.

Figure 3:
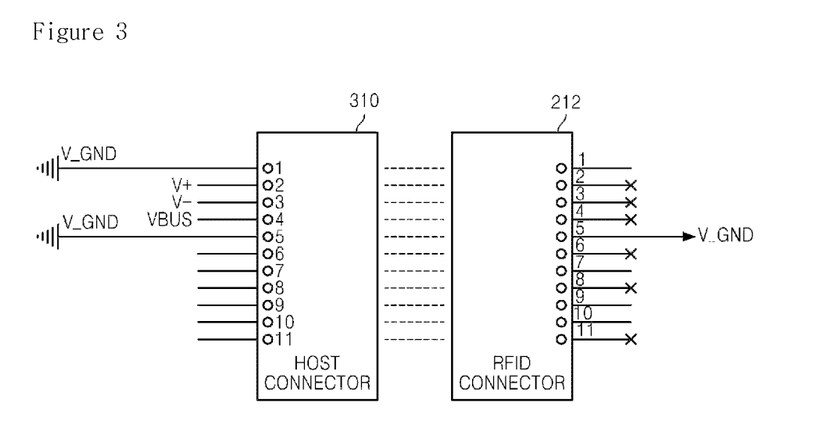
FIG. 3 illustrates a map of interface pins in an RFID connector illustrated in FIG. 2 and a host connector.

FIG. 3 illustrates a map of interface pins in the RFID connector 212 illustrated in FIG. 2 and a host connector 310. Referring to FIG. 3, the RFID connector 212 and the host connector 310 may include a plurality of interface pins 1 through 11. When the RFID connector 212 is connected with the host connector 310, a control voltage V_GND (e.g., a ground voltage) may be supplied from the host to the voltage supply controller 219 via the interface pins 5.

Figure 4:
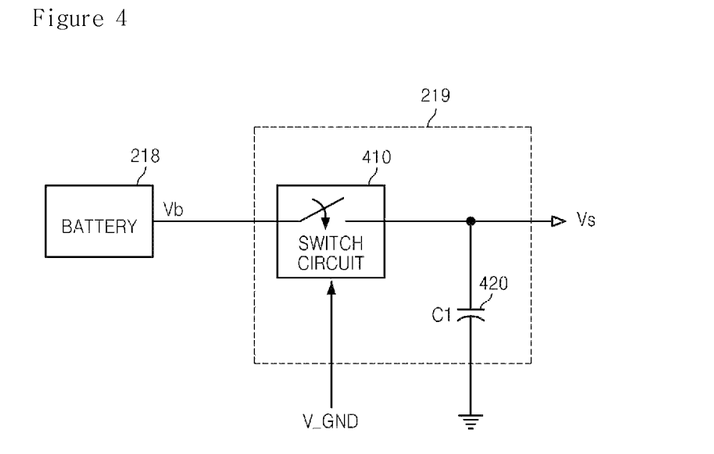
FIG. 4 illustrates a voltage supply controller illustrated in FIG. 2.

FIG. 4 illustrates the voltage supply controller 219 illustrated in FIG. 2. Referring to FIGS. 3 and 4, the voltage supply controller 219 includes a switch circuit 410 and a capacitor C1 420.

The switch circuit 410 may operate based on the control voltage V_GND, which is supplied from the host when the RFID connector 212 is connected with the host connector 310, so that the predetermined battery voltage Vb can be supplied to the microprocessor 214 and/or the RF transceiver 216. The control voltage V_GND may be a ground voltage. When the RFID connector 212 is not connected with the host connector 310, that is, when the control voltage V_GND is not supplied from the host, the switch circuit 410 may interrupt the supply of the predetermined battery voltage Vb to the microprocessor 214 and/or the RF transceiver 216.

The capacitor C1 prevents the level of the predetermined battery voltage Vb supplied from the battery 218 from rapidly changing due to noise, thereby stabilizing a voltage Vs supplied to the microprocessor 214 and/or the RF transceiver 216. At this time, the voltage Vs supplied to the microprocessor 214 and/or the RF transceiver 216 may have a different level than the voltage Vb supplied from the battery 218. For this case, the voltage supply controller 219 may further include a voltage level converter (not shown) or a level shifter (not shown).

Figure 5:
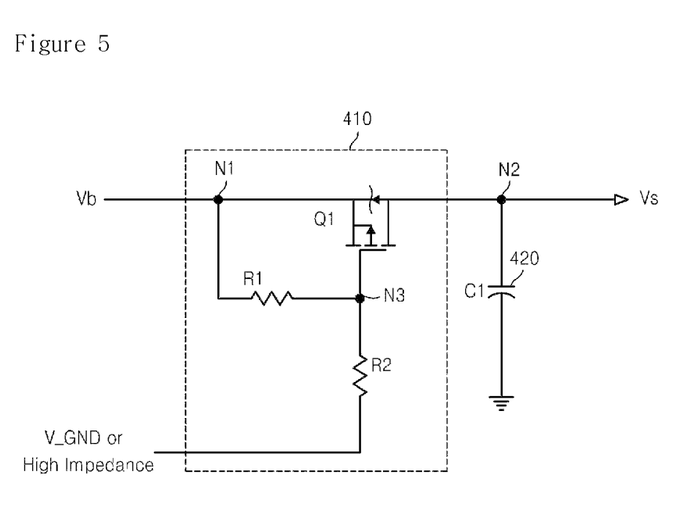
FIG. 5 illustrates a switch circuit illustrated in FIG. 4.

FIG. 5 illustrates the switch circuit 410 illustrated in FIG. 4. Referring to FIG. 5, the switch circuit 410 may include a transistor Q1, a first resistor R1, and a second resistor R2.

The transistor Q1 may be implemented by a P-channel metal-oxide semiconductor (PMOS) transistor having a first terminal (e.g., a source) connected with a first node N1, a second terminal (e.g., a drain) connected with a second node N2, and a third terminal (e.g., a gate) connected with a third node N3. The transistor Q1 may include a Zener diode in a direction from the drain (or the second node N2) to the source (or the first node N1). The first node N1 and the third node N3 are connected with each other via the first resistor R1. The first node N1 receives the predetermined battery voltage Vb from the battery 218. The second node N2 is an output node of the voltage supply controller 219 and is connected with the capacitor C1.

The first resistor R1 is connected between the first node N1 and the third node N3. The second resistor R2 has a first terminal connected with the third node N3 and a second terminal connected with the interface pin 5 of the RFID connector 212. Accordingly, the second terminal of the second resistor R2 may be connected with the ground voltage V_GND supplied from the host when the RFID connector 212 is connected with the host connector 310 and may have high impedance when the RFID connector 212 is not connected with the host connector 310.

The operation of the switch circuit 410 will be described with reference to FIGS. 3 and 5. When the RFID connector 212 is connected with the host connector 310, the second resistor R2 is connected with the ground voltage V_GND supplied from the host and the voltage of the third node N3 becomes a voltage (Vb×2/(R1+R2)) resulting from dividing the predetermined battery voltage Vb by the first resistor R1 plus the second resistor R2. Accordingly, the transistor Q1 is turned on and the predetermined battery voltage Vb is supplied to the second node N2.

When the RFID connector 212 is not connected with the host connector 310, the second terminal of the second resistor R2 has high impedance and the voltage of the third node N3 becomes almost equal to the predetermined battery voltage Vb of the first node N1. Accordingly, the transistor Q1 is turned off and the supply of the predetermined battery voltage Vb to the second node N2 is interrupted.

The switch circuit 410 illustrated in FIG. 5 is just one embodiment of the present invention and can be embodied differently.

Figure 6:
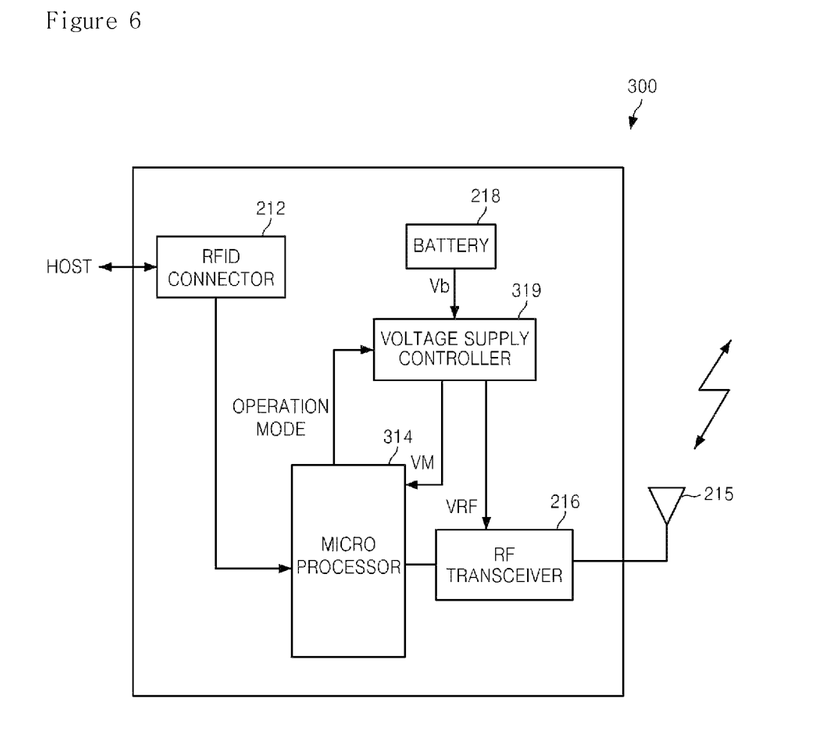
FIG. 6 illustrates an RFID device according to other embodiments of the present invention.

FIG. 6 illustrates an RFID device 300 according to other embodiments of the present invention. Referring to FIG. 6, the RFID device 300 includes the RFID connector 212, a microprocessor 314, the antenna 215, the RF transceiver 216, the battery 218, and a voltage supply controller 319. Among the elements of the RFID device 300, elements having the same reference numerals as those of the RFID device 200 illustrated in FIG. 2 have the same functions and structures as those of the RFID device 200, and therefore, detailed descriptions thereof will be omitted and differences will be described below. The microprocessor 314 performs data communication with a host via the RFID connector 212, receives tag information from a tag via the RF transceiver 216, and detects an operation mode based on the voltage level of a data receiving line of the RFID connector 212. The voltage supply controller 319 operates to control the supply or the interruption of the predetermined battery voltage Vb to the RF transceiver 216 based on the operation mode.

In order to control the voltage supply to the RF transceiver 216 based on the operation mode, the voltage supply controller 319 may have a similar structure to that illustrated in FIGS. 4 and 5, with the exception that the switch circuit 410 operates based on the operation mode of the RFID device 300 with respect to the host and only voltage VRF supplied to the RF transceiver 216 is controlled by the voltage supply controller 319. This will be easily inferred by those skilled in the art from the description of FIGS. 4 and 5. Thus, detailed descriptions of the operations will be omitted.

Figure 7:
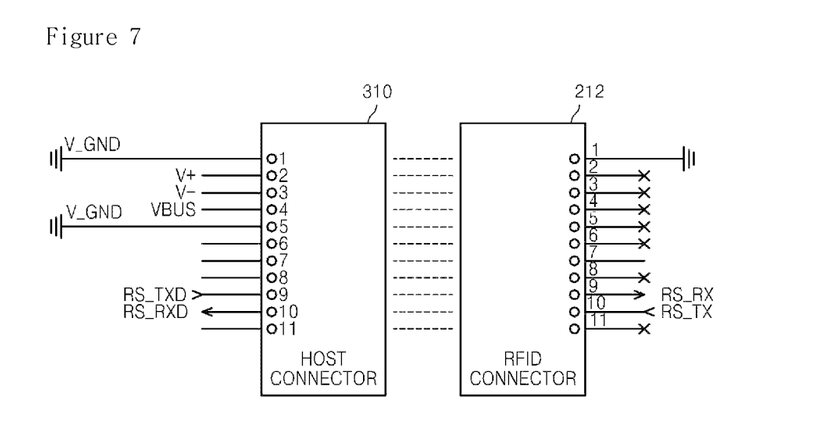
FIG. 7 illustrates a map of interface pins in an RFID connector illustrated in FIG. 6 and a host connector.

FIG. 7 illustrates a map of interface pins in the RFID connector 212 illustrated in FIG. 6 and the host connector 310. Referring to FIG. 7, interface pins 9 of the RFID connector 212 and the host connector 310 are connected with data receiving lines RS_RX and RS_TXD, respectively, and interface pins 10 of the RFID connector 212 and the host connector 310 are connected with data transmitting lines RS_TX and RS_RXD, respectively.

Figure 8:
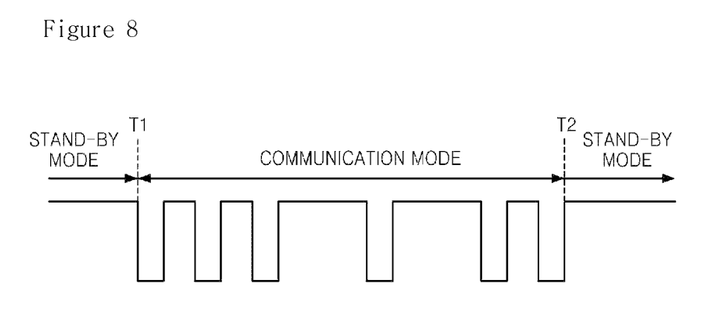
FIG. 8 illustrates a voltage level of a data receiving line in a communication mode of an RFID device, according to some embodiments of the present invention.
Figure 9:
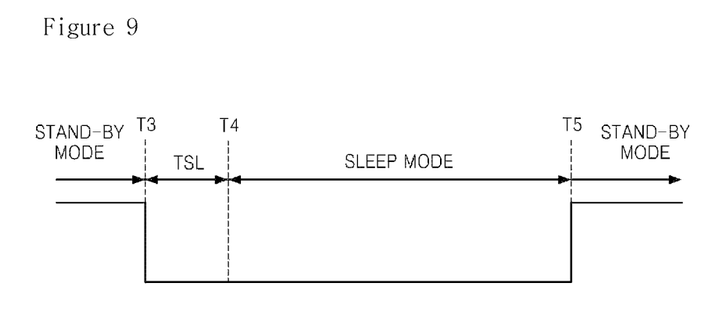
FIG. 9 illustrates a voltage level of a data receiving line in a sleep mode of an RFID device, according to some embodiments of the present invention.

FIG. 8 illustrates the voltage level of the data receiving line RS_RX in a communication mode of the RFID device 300, according to some embodiments of the present invention. FIG. 9 illustrates the voltage level of the data receiving line RS_RX in a sleep mode of the RFID device 300, according to some embodiments of the present invention.

A procedure in which a voltage supplied to each element of the RFID device 300 is controlled according to the operation mode of the RFID device 300 will be described with reference to FIGS. 6 through 9 below. In the embodiments of the present invention, the operation mode is detected based on the voltage of the data receiving line RS_RX, but the present invention is not restricted to these embodiments.

Referring to FIG. 8, the voltage of the data receiving line RS_RX of the RFID connector 212 is maintained at a first level (e.g., a high level) when the RFID device 300 is in a stand-by mode. When the voltage of the data receiving line RS_RX is maintained at the first level, the microprocessor 314 may detect the operation mode of the RFID device 300 as the stand-by mode.

When the RFID device 300 is in a communication mode, the voltage of the data receiving line RS_RX starts to transit from the first level to a second level (e.g., a low level) and then data is transmitted at a predetermined rate. The voltage supply controller 319 supplies voltages VM and VRF to the microprocessor 314 and the RF transceiver 216, respectively, when the RFID device 300 is in the stand-by mode or the communication mode.

Referring to FIG. 9, when the voltage of the data receiving line RS_RX is maintained at the second level for a predetermined period of time TSL, i.e., T3 to T4 since the voltage transits from the first level to the second level, the microprocessor 314 may detect the operation mode of the RFID device 300 as a sleep mode T4 to T5. When the RFID device 300 is in the sleep mode, the voltage supply controller 319 interrupts the voltage VRF supplied to the RF transceiver 216 but does not interrupt the voltage VM supplied to the microprocessor 314, thereby reducing power consumption of the RFID device 300 in the sleep mode and enabling the RFID device 300 to quickly transit to the stand-by mode or the communication mode. In other words, when the RFID device 300 is in the sleep mode, the RFID device 300 interrupts the voltage VRF supplied to every element (e.g., the RF transceiver 216) except for the microprocessor 314, thereby reducing power consumption.

When the voltage of the data receiving line RS_RX transits from the second level to the first level in the sleep mode, the microprocessor 314 detects the operation mode of the RFID device 300 as the stand-by mode, which is referred to as a wake-up. Then, the voltage supply controller 319 supplies the voltage VRF to the RF transceiver 216.

In the current embodiments of the present invention, the RFID device 300 controls the supply of the voltage VRF to the RF transceiver 216 according to the operation mode, but the present invention is not restricted to these embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a voltage supplied from a battery to elements of a radio frequency identification (RFID) device is interrupted when the RFID device is not connected with a host and voltage supply to the elements is controlled based on an operation mode of the RFID device, so that power consumption can be reduced and the use time of the RFID device can be extended.

The invention claimed is:

1. A radio frequency identification (RFID) device comprising: an RFID connector configured to be connected with a host connector for data interface;
   a radio frequency (RF) transceiver configured to perform wireless data communication with a tag;
   a microprocessor configured to perform data communication with a host via the RFID connector and receive tag information from the tag via the RF transceiver;
   a battery configured to supply a predetermined battery voltage; and a voltage supply controller configured to control supply of the predetermined battery voltage to the microprocessor and the RF transceiver based on connection or disconnection between the RFID connector and the host connector,
   wherein the voltage supply controller provides the predetermined battery voltage to the microprocessor and the RF transceiver when the RFID connector is connected with the host connector, and wherein the radio frequency (RF) transceiver performs wireless data communication only when the predetermined battery voltage is supplied from the voltage supply controller, wherein when the RFID connector is disconnected from the host connector, the predetermined interface pin has high impedance and the switch circuit operates to interrupt the predetermined battery voltage supplied to the capacitor based on the high impedance of the predetermined interface pin.

2. The RFID device of claim 1, wherein the voltage supply controller comprises:
   a switch circuit configured to supply the predetermined battery voltage to the microprocessor and/or the RF transceiver or interrupt the supply of the predetermined battery voltage to the microprocessor and/or the RF transceiver based on the connection or disconnection between the RFID connector and the host connector; and
   a capacitor configured to be charged based on a voltage output from the switch circuit.

3. The RFID device of claim 2, wherein the RFID connector comprises a plurality of interface pins, and the switch circuit operates to supply the predetermined battery voltage to the capacitor based on a control voltage supplied from the host via a predetermined interface pin among the plurality of interface pins when the RFID connector is connected with the host connector.

4. The RFID device of claim 3, wherein when the RFID connector is connected with the host connector, the predetermined interface pin is connected with a ground pin of the host connector.

5. The RFID device of claim 4, wherein the switch circuit comprises:
   a transistor comprising a drain connected with a first node, a source connected with a second node, and a gate connected with a third node;
   a first resistor connected between the first node and the third node; and
   a second resistor comprising a first terminal connected with the third node and a second terminal connected with the predetermined interface pin, and
   wherein the first node is a node to which the predetermined battery voltage is supplied and the second node is connected with the capacitor.

6. A radio frequency identification (RFID) device comprising:
   an RFID connector configured to be connected with a host connector for data interface;
   a radio frequency (RF) transceiver configured to perform wireless data communication with a tag;
   a microprocessor configured to perform data communication with a host via the RFID connector, receive tag information from the tag via the RF transceiver, and detect an operation mode based on a voltage level of a data receiving line of the RFID connector;
   a battery configured to supply a predetermined battery voltage; and
   a voltage supply controller configured to control supply of the predetermined battery voltage to the RF transceiver based on the operation mode,
   wherein the voltage supply controller provides the predetermined battery voltage to the microprocessor and the RF transceiver when the RFID connector is connected with the host connector.

7. The RFID device of claim 6, wherein the voltage supply controller comprises:
   a switch circuit configured to supply the predetermined battery voltage to the RF transceiver or interrupt the supply of the predetermined battery voltage to the RF transceiver based on the operation mode; and
   a capacitor configured to be charged based on a voltage output from the switch circuit.

8. The RFID device of claim 7, wherein the microprocessor detects the operation mode as a stand-by mode when the voltage level of the data receiving line is maintained at a first level for a predetermined period of time and detects the operation mode as a sleep mode when the voltage level of the data receiving line is maintained at a second level for a predetermined period of time since the voltage level transits from the first level to the second level.

9. The RFID device of claim 8, wherein the switch circuit supplies the predetermined battery voltage to the RF transceiver when the operation mode is detected as the stand-by mode or a communication mode and interrupts the supply of the predetermined battery voltage to the RF transceiver when the operation mode is detected as the sleep mode.

10. A method of controlling power supply of a radio frequency identification (RFID) device according to connection with a host, the method comprising:
    supplying a predetermined battery voltage; and controlling supply of the predetermined battery voltage to a microprocessor and a radio frequency (RF) transceiver of the RFID device based on connection or disconnection between a RFID connector of the RFID device and a host connector of the host,
    wherein the predetermined battery voltage is provided to the microprocessor and the RF transceiver when the RFID connector is connected with the host connector, and wherein the radio frequency (RF) transceiver performs wireless data communication only when the predetermined batter,/voltage is supplied from the voltage supply controller,
    wherein the supplying the predetermined battery voltage to the microprocessor and/or the RF transceiver comprises supplying the predetermined battery voltage to the capacitor based on a control voltage supplied from the host via a predetermined interface in among a plurality of interface pins when the RFID connector is connected with the host connector.

11. The method of claim 10, wherein the controlling the supply of the predetermined battery voltage to the microprocessor and/or the RF transceiver of the RFID device comprises:
    supplying the predetermined battery voltage to the microprocessor and/or the RF transceiver based on the connection or disconnection between the RFID connector and the host connector;
    interrupting the supply of the predetermined battery voltage to the microprocessor and/or the RF transceiver based on the connection or disconnection between the RFID connector and the host connector; and
    charging a capacitor based on a voltage supplied to the microprocessor and/or the RF transceiver.

12. The method of claim 10, wherein the interrupting the supply of the predetermined battery voltage to the microprocessor and/or the RF transceiver comprises interrupting the predetermined battery voltage supplied to the capacitor based on high impedance of the predetermined interface pin when the RFID connector is disconnected from the host connector.

13. The method of claim 10, the method further comprising:
- detecting an operation mode based on a voltage level of a data receiving line of the RFID connector of the RFID device; and
- controlling supply of the predetermined battery voltage to the radio frequency (RF) transceiver based on the operation mode.

14. The method of claim 13, wherein the detecting the operation mode based on the voltage level of the data receiving line of the RFID connector of the RFID device comprises:
- detecting the operation mode as a stand-by mode when the voltage level of the data receiving line is maintained at a first level for a predetermined period of time; and
- detecting the operation mode as a sleep mode when the voltage level of the data receiving line is maintained at a second level for a predetermined period of time since the voltage level transits from the first level to the second level.

15. The method of claim 14, wherein the controlling the supply of the predetermined battery voltage to the RF transceiver based on the operation mode comprises:
- supplying the predetermined battery voltage to the RF transceiver or interrupting the supply of the predetermined battery voltage to the RF transceiver based on the operation mode; and
- charging a capacitor based on a voltage supplied to the RF transceiver.

16. The method of claim 15, wherein the supplying the predetermined battery voltage to the RF transceiver or interrupting the supply of the predetermined battery voltage to the RF transceiver based on the operation mode comprises:
- supplying the predetermined battery voltage to the RF transceiver when the operation mode is detected as the stand-by mode or a communication mode; and
- interrupting the supply of the predetermined battery voltage to the RF transceiver when the operation mode is detected as the sleep mode.

* * * * *